United States Patent Office 2,796,113
Patented June 18, 1957

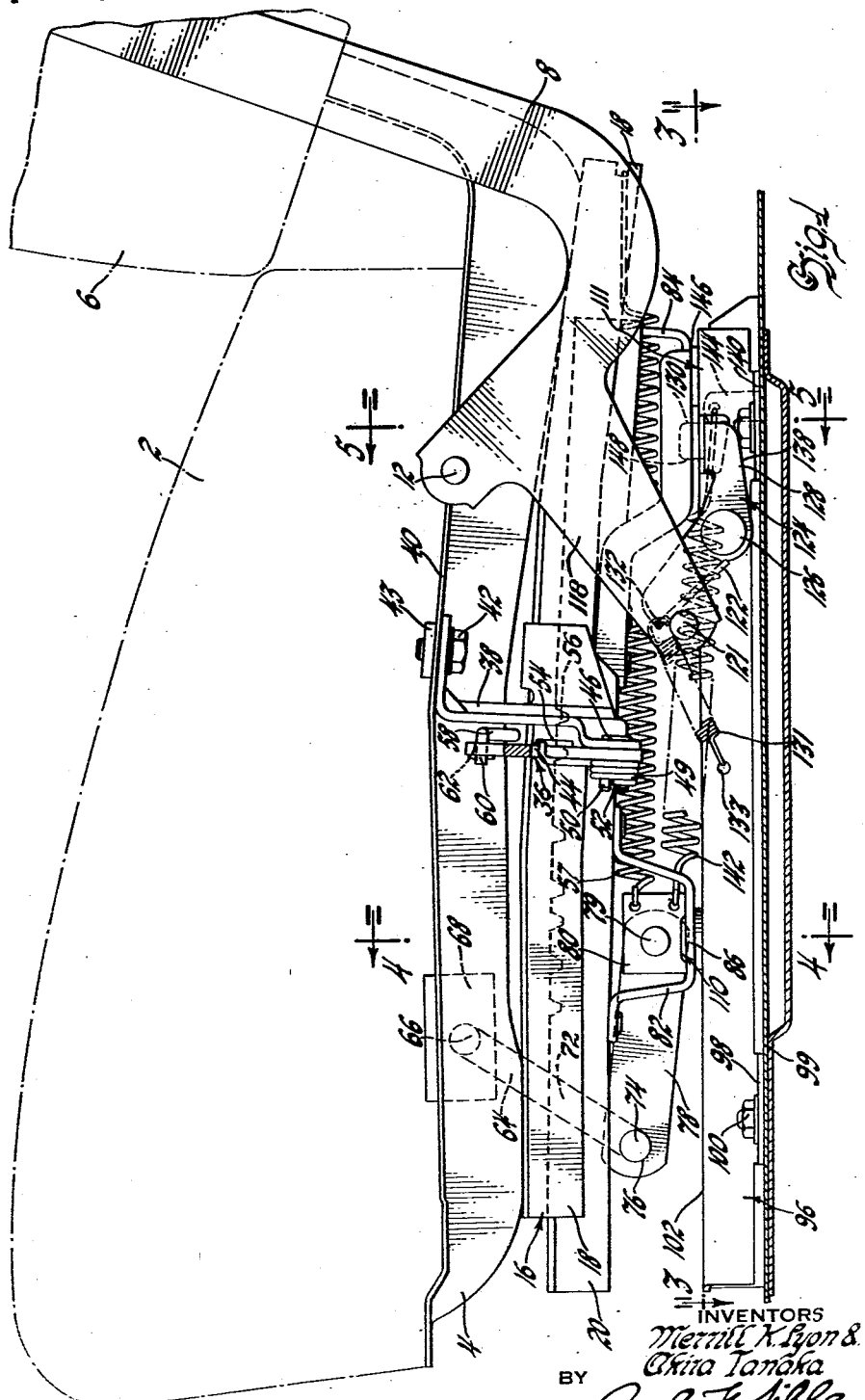

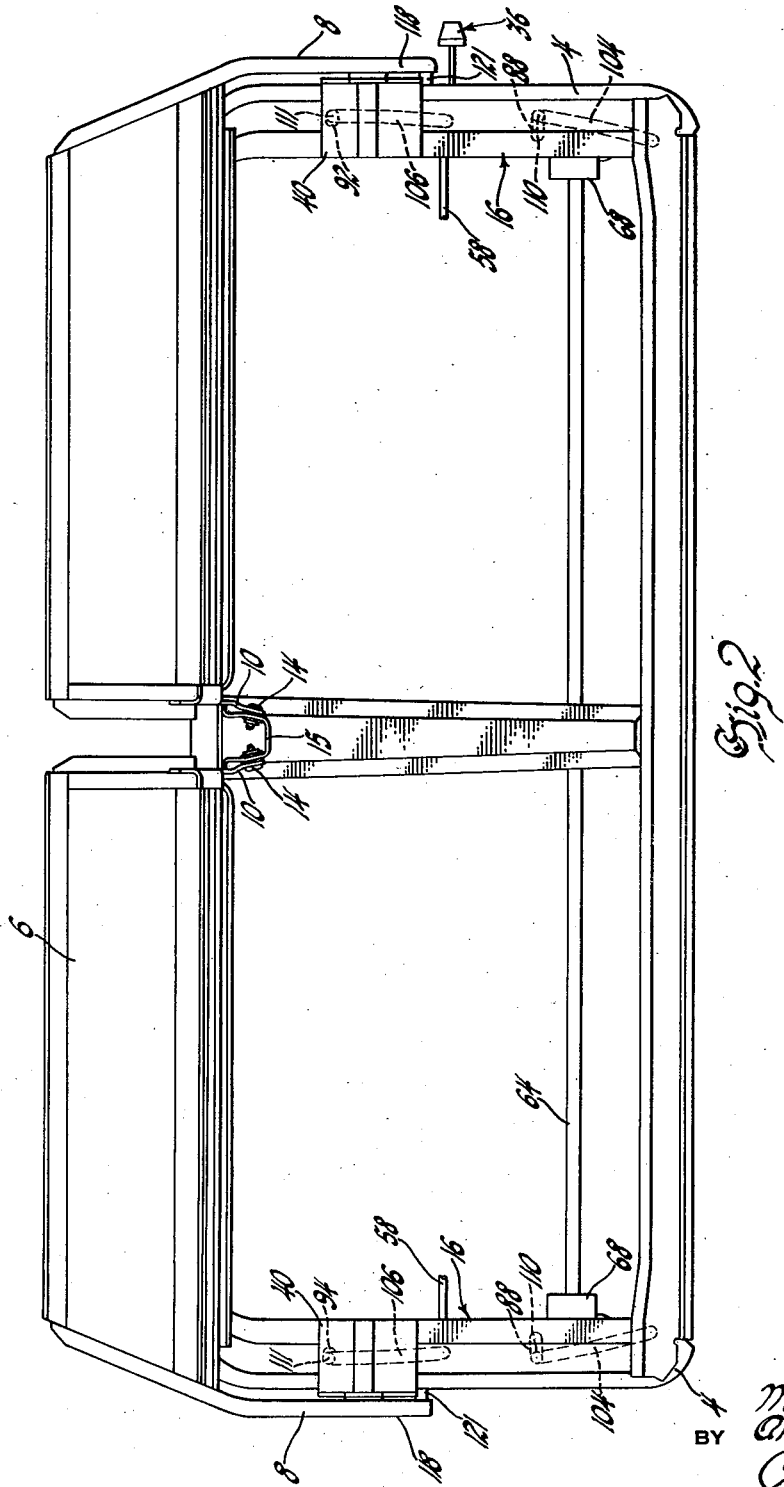

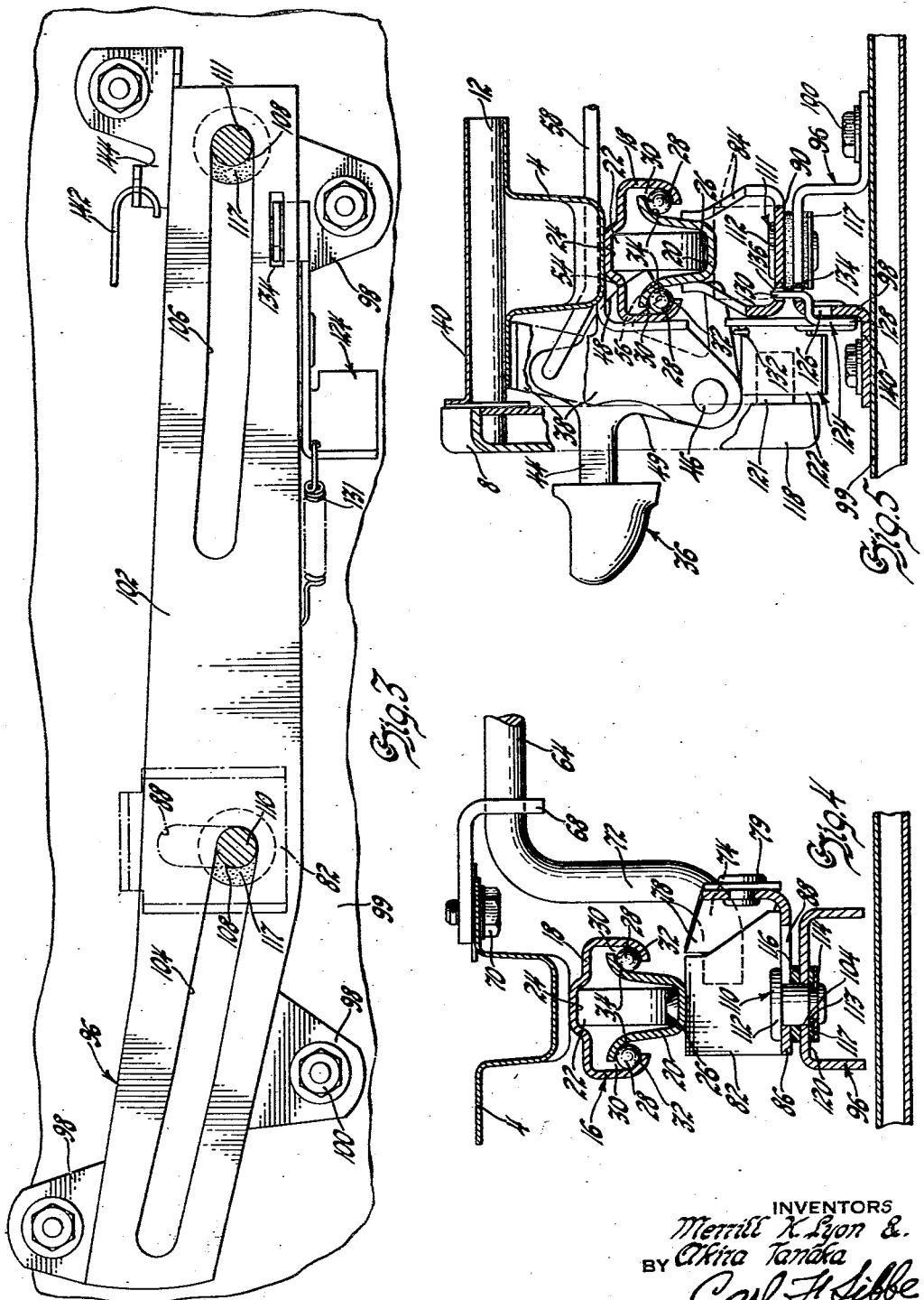

2,796,113

SEAT ADJUSTER MECHANISM

Merrill K. Lyon, Birmingham, and Akira Tanaka, Southfield Township, Oakland County, Mich., assignors to General Motors Corporation, Detroit, Mich., a corporation of Delaware Application April 22, 1953, Serial No. 350,408

7 Claims. (Cl. 155—14)

This invention relates to adjustable seat structures and more particularly to adjustable front seats having means responsive to tilting movement of the seat backs for providing additional entrance space when entering or alighting from the rear seat.

It is well known in the prior art to provide a seat mechanism wherein tilting movement of the seat back is accompanied by swinging or linear movement of the entire seat. However, in the past such mechanisms have been complicated and were not, in general, adaptable for use in conjunction with conventional mechanisms required for normal fore and aft adjustment.

One object of the invention is to provide a split back front seat which is adjustable to a plurality of fixed positions and temporarily movable in response to tilting movement of either seat back.

Another object is to provide a vehicle seat having conventional form and aft adjuster mechanisms and means associated therewith for imparting temporary forward movement to the seat in response to tilting movement of the seat backs.

A furher object is to provide a seat of the type described wherein the seat backs are pivotally mounted in a manner providing forward and inward tilting movement.

A still further object is to provide a seat of the type described which is automatically returned to the normal position when the seat backs are returned to the normal position.

Yet another object is to provide a seat mechanism of the type described wherein the seat is adapted for both linear and swinging movement in response to tilting movement of the seat backs.

Still a further object is to provide a seat mechanism of the type described having means for preventing yawing of the seat during fore and aft adjustment to various fixed positions which are unaffected by swinging movement of the seat.

These and other objects and advantages of the invention will become more fully apparent from the following description wherein reference is made to the accompanying drawings illustrating the preferred embodiment of the invention and wherein similar reference numerals designate similar parts throughout the several views.

In the drawings:

Fig. 1 is a side elevational view, partly in section, showing the relative disposition of the seat, the fore and aft adjuster mechanism and the temporary traversing mechanism.

Fig. 2 is a skeletonized plan view showing the seat frame and portions of the mechanism associated therewith for providing temporary forward movement of the seat.

Fig. 3 is a plan view of one of the guide plates utilized to provide temporary longitudinal swinging movement of the seat.

Fig. 4 is a front elevational view, partly in section, taken substantially along the line 4—4 of Fig. 1, showing the vertical relation of the guide plate, adjuster rails and seat frame and, Fig. 5 is a front elevational view, partly in section, taken substantially along the line 5—5 of Fig. 1.

Referring now to the drawings and particularly Fig. 1 there is illustrated a vehicle seat assembly wherein numeral 2 designates a bench-type seat mounted on a sheet metal frame and disposed transversely of a vehicle body. Near the rear edge of seat 2, in side by side relation, are a pair of substantially vertical split backs 6 having depending outer hinge arms 8 and inner hinge arms 10. Hinge arms 8 are journalled on trunnions 12 formed near the rear outer edges of frame 4 and arms 10 are pivotally secured by pivot studs 14 to a U-shaped bracket 15 mounted centrally on the upper rear edge of seat 2. As seen best in Fig. 2, the axis of rotation defined by the respective trunnions 12 and studs 14 for each seat back 6 causes the said seat backs to swing forwardly and inwardly with reference to the lateral axis of seat 2. Seat 2 extends across substantially the entire width of the interior of the vehicle and is slidably supported on a pair of widely spaced apart fore and aft adjuster mechanisms 16 of conventional construction. Adjuster mechanisms 16 are adapted to permit manual slidable movement of the entire seat to various fixed positions fore and aft of the longitudinal axis of the vehicle, in order to allow the vehicle operator to select the most comfortable driving position.

Since the construction of both adjuster mechanisms is identical, a description of one will be understood to apply to both. As seen best in Figs. 1, 4 and 5, each adjuster mechanism 16 includes an elongated upper channel member 18 which is generally U-shaped in cross section and is secured to the sheet metal seat frame 4 by welding or other suitable means. A lower channel member 20, of generally V-shaped cross section, is disposed within upper channel 18 and serves as a guide rail for upper channel 18. In order to reduce friction and provide smooth and silent fore and aft movement of upper channel 18 along lower channel 20, a plurality of relatively narrow, large diameter rollers 22 are disposed at spaced intervals between the opposed inner longitudinal surfaces 24 and 26, respectively, of channels 18 and 20. After disposing the rollers 22 in position, a plurality of ball bearings 28 are inserted and spaced at intervals in the longitudinally extending spaces 30 formed by the curved overlapping edges 32 and 34 of upper and lower channels 18 and 20, respectively. Since the ball bearings 28 are larger in diameter than the normal cross sectional diameter of longitudinal spaces 30, the respective channels are caused to spring slightly, thereby placing the entire assembly in compression. It will, therefore, be seen that the ball bearings 28 and rollers 22 eliminate looseness or rattling of channel members 18 and 20, yet assure smooth silent rolling contact therebetween when upper channel 18 is moved fore and aft.

To positively retain the seat in any selected position within the normal range of adjustment, upper channel 18 may be locked in any of several predetermined positions along lower channel 20 by means of a manual latch assembly 36. Latch assembly 36 comprises a bracket 38 which is secured midway on the flanged outer edge 40 of seat frame 4 by a bolt 42 and nut 43. A plate member 44 is rotatably secured to bracket 38 by a pivot stud 46 and is provided with a laterally inwardly extending finger portion 48. A coil spring 49 surrounds the outer end 50 of stud 46 and at one end engages a slot 52 formed in stud 46. At its opposite end spring 49 resiliently engages one edge of plate 44 to spring urge the plate in a counterclockwise direction. When plate 44 is in the normal spring urged position, finger portion 48 extends through a rectangular aperture 54 in upper channel 18 and engages one of a plurality of longitudinally spaced slots 56 formed in lower channel 20 to rigidly secure upper channel 18 against longitudinal movement relative to lower channel 20. When blade 44 is swung downwardly against the pressure of spring 49, finger portion 48 is withdrawn from engagement with slot 56 to permit manual movement of the seat 2. Coil spring 57 disposed in tension between projection 80 and the rear end of upper channel 18, assists manual forward movement. Upon release of blade 44 finger portion moves laterally inwardly to engage another of slots 56 to retain the seat in the new position. To assure simultaneous engagement and disengagement of the latch mechanisms 36 on both sides of the seat, a transverse tie rod 58 extends across the seat directly beneath the seat frame 4 and is provided with bent end portions 60 adapted for engagement with apertures 62 formed at the free ends of plate members 44.

In order to prevent yawing motion of the seat during fore and aft adjustment to the various fixed positions, there is provided an equalizer mechanism comprising an elongated bar 64 which is journalled in apertures 66 formed in brackets 68. Each bracket 68 is secured by bolts 70 at opposite sides of the seat frame 4, adjacent the inner edges of adjuster mechanisms 16. At its opposite ends, bar 64 is provided with integral parallel depending leg portions 72 having short transversely extending terminal portions 74 adapted for pivotal engagement in aperture 76 formed in links 78. Links 78 are pivotally secured by studs 79 to vertically projecting portions 80 formed integrally on front supporting brackets 82 which are, in turn, riveted to the lower forward portion of lower channel members 20. When latch mechanism 36 is released to permit forward movement of the seat, leg portions 72 of bar 64 rotate counterclockwise, as seen from the left, since longitudinal movement of the terminal portions 74 is prevented by links 78. It will, therefore, be apparent that unequal rate of travel of the respective upper channels 18 will cause one leg 74 to rotate more rapidly than the other, thereby producing twisting of the bar 64 which reacts against the slower moving leg 74 to equalize the rate of movement of upper channels 18 and again bring the opposite sides of the seat into transverse alignment.

In accordance with the present invention, to temporarily move the seat longitudinally in response to tilting movement of either seat back, adjuster mechanisms 16 are mounted on front supporting brackets 82, previously mentioned, and rear supporting brackets 84. Front supporting brackets 82 are provided with downwardly offset horizontal surfaces 86 having transversely extending elongated slots 88 formed therein. Rear supporting brackets 84 are provided with downwardly offset horizontal flat surfaces 90, one of which is formed with a circular aperture 92 and the other with a slightly elongated slot 94. Directly beneath each adjuster mechanism 16, substantially in alignment with their respective front and rear supporting brackets 82 and 84, is a longitudinally extending inwardly curved guide plate 96. Guide plate 96 is generally U-shaped in cross section and is provided with a plurality of downwardly offset laterally extending feet 98 adapted for attachment to the floor 99 of the vehicle by bolts 100. As seen best in Fig. 3, the upwardly offset horizontal surface 102 of each guide plate 96 is formed with a pair of longitudinally spaced, relatively long arcuate slots 104 and 106. When the seat 2 is disposed in position on the guide plates 96, the slots 88 and 90 in brackets 82 and 84 and the curved slots 104 and 106 in plate 96 register to form vertical passages 108 which provide clearance for endwise insertion of studs 110 and 111. Studs 110 and 111 are formed with enlarged flat heads 112 at one end and with circumferential grooves 113 at their opposite ends which are adapted to receive retaining washers 114 of approximately the same diameter as the flat heads 112. To prevent rattling or scraping between brackets 82 and 84 and guide plate 96, suitable resilient anti-friction washers 116 are disposed between the respective supporting brackets and guide plate 96 in alignment with the vertical passages 108. After inserting studs 110 and 111 in position, resilient washers 117 are placed around the lower ends of studs 110 and 111 in contact with the lower surface 120 of plate 96 and are retained in position thereon by retainer washers 114. After brackets 82 and 84 are connected to plate 96 in the manner described, the seat 2 is freely slidable along the guide plates 96 while vertical separation of the brackets and guide plate is prevented.

To impart temporary horizontal swinging movement to the seat 2 in response to tilting movement of either seat back 4, outer hinge arm 8 is provided with an integral extension 118 which extends downwardly and forwardly from the pivotal connection on trunnion 12. Near the lower end of extension 118 there is secured an inwardly projecting stud 121 which is adapted upon tilting movement of seat back 6 to bear rearwardly against an inclined flanged surface 122 formed on the latch 124. Latch 124 is pivotally secured on guide plate 96 by a stud 126 and is formed with a generally horizontal rearwardly extending arm portion 128 having a vertically struck-up finger portion 130 integral therewith. A coil spring 131 is connected between an aperture 132, in the upper extremity of latch 124 and aperture 133 in guide plate 96 to spring urge latch 124 in a counterclockwise direction, thereby causing struck-up portion 130 to extend upwardly through a rectangular slot 134 formed in guide plate 96 and engage a second rectangular slot 136 formed in bracket 84. It will be seen that upon forward tilting movement of seat back 6, stud 121 swings rearwardly into engagement with flange 122 of latch 124. Upon further rearward movement of stud 121, latch 124 swings clockwise against spring 131 causing finger portion 130 to be withdrawn downwardly from the slots 136 and 134 of bracket 84 and guide plate 96, respectively. When finger portion 130 has been fully withdrawn, the lower edge 138 of latch 124 abuts the upper surface 140 of one leg of guide plate 96 which prevents further clockwise movement of the latch. Since the latch thereafter acts as a fixed abutment, stud 121 is prevented from further rearward movement and subsequent forward tilting movement of the seat back reacts against trunnion 12 causing forward arcuate movement of the seat 2 along a path defined by slots 104 and 106 in guide plate 96. To cause the seat 2 to return to normal position after return of the seat back 6 to the normal upright position, a strong coil spring 142 disposed in tension between a struck-up projection 144 formed on the rear inner edge of cam plate 96 and the struck-up projection 80 formed on the supporting bracket 82. Since the tension of spring 142 is considerably increased when the seat 2 moved to the forward temporary position, it will be apparent that the spring will tend to contract to return the seat to normal position when stud 121 of extension 118 is moved out of engagement with flange 122 on latch 124 by manually returning the seat back 6 to the normally upright position. During rearward movement of the seat 2, the brackets 82 and 84 slide along guide plate 96 until the curved heel 146 of bracket 84 reaches the forward edge 148 of finger portion 130. As the seat continues to travel rearwardly, heel 146 depresses finger portion 130 against the tension of coil spring 132 sufficiently to permit continued rearward movement of the seat. As the seat reaches the normal transversely aligned position shown in Fig. 1, slots 134 and 136 of bracket 84 and guide plate 96, respectively, return to vertical registry and permit finger portion 130 to swing upwardly in response to spring 132 to positively lock the seat against both forward and rearward movement.

In order to more clearly understand the invention, a description of the mode of operation will be given. It will be understood that when only one seat back 6 is tilted forward, as for instance, the left seat back, the right side of the seat 2 will be restrained against forward movement by the latching action of finger portion 130 in the slots 134 and 136 in support 84 and guide 96. Therefore, as the left seat back is tilted forwardly the seat 2 swings forwardly in a horizontal arc about an axis defined by the right rear pivot stud 111. As seen best in Fig. 2, when the seat pivots about the right rear stud 111, both front supporting brackets 82 and left rear supporting bracket 84 travel in arcs generated from right rear stud 111. Thus, the right rear portion of the seat 2 rotates about the pivot 111, the right front portion of the seat swings laterally outwardly and the entire left side of the seat swings forwardly and inwardly. Since slots 104 and 106 of plates 96 define arcuate paths generated by the opposite rear pivot studs 111, it will be apparent that studs 110 and 111 on the left side of the seat will travel in a path identical with that of the curved slots 104 and 106. However, since the right front portion of the seat swings laterally outwardly, right front pivot stud 110 remains stationary at the rear of curved slot 104 as the transversely slotted right front supporting bracket 82 moves laterally outwardly. In this connection it will be noted that when the seat 2 is in the normal transversely aligned position the front pivot studs 110 occupy the outer-most limits of transverse slots 84 in front supporting brackets 82. By virtue of this construction limited lateral movement of the front of the seat or any combination of lateral and longitudinal movement may be accomplished. Therefore, after the left side of the seat has traveled through its limit of arcuate movement, the right side of the seat may also be swung forwardly in the same manner without first returning the left side to the normal position. However, in the preferred embodiment when the left seat back is in the full forward position only limited forward swinging movement of the right seat back is possible since the inner edges of each seat back overlap, because of the forward and inward tilting characteristic, thereby limiting the amount of forward swinging movement on one side when the other side is in the full forward position. It will be understood, however, that the invention may be applied to a seat construction wherein the hinge axis of the seat backs is parallel with the transverse axis of the seat, in which case swinging movement of the seat may be accomplished alternately or successively and linear horizontal movement may be accomplished by simultaneously tilting both seat backs.

From the foregoing description it will be seen that the invention provides an improved and simplified vehicle seat construction providing greatly increased entrance space to the rear seat of a vehicle from either side. In addition, the mechanism is constructed in a manner permitting operation when both doors of the vehicle are closed. The device employs, for the most part, conventional seat construction heretofore common in production passenger vehicles and such additional parts as are required are simple in construction, low in cost and easily fabricated.

While the single embodiment of the invention herein disclosed constitutes the preferred form thereof, it is apparent that other changes and modifications may be made therein without departing from the invention. It is to be understood therefore that it is not intended to limit the invention to the single embodiment disclosed herein but only by the scope of the claims which follow.

We claim:

1. A seat having tiltable seat backs mounted thereon in side by side relation, a pair of spaced apart guide mechanisms each having forwardly and inwardly converging slots formed therein, pivot means connecting said seat with said slots, means on each of said guide mechanisms normally retaining said seat in fixed relation on said guide mechanisms, and means on said seat backs adapted to abuttingly engage said last mentioned means to release said seat for swinging movement from either side about an axis located at the opposite side in response to tilting movement of either of said seat backs.

2. A seat having tiltable seat backs pivotally mounted thereon in side by side relation, a pair of generally parallel spaced apart guide mechanisms having arcuate slots formed therein, a pair of rails secured to said seat, a second pair of rails cooperating with said first mentioned rails to provide fore and aft adjustment of said seat to a plurality of fixed positions, legs formed on said cooperating rails and supported on said guide mechanisms, said legs having slots formed therein and adapted to register with said slots in said guide mechanisms, pivot means extending through said slots to slidably secure said seat on said guide mechanisms, a pivotal latch on each of said guide mechanisms normally retaining said seat in a transversely aligned fixed position on said guide mechanisms, and projections carried by said seat backs and adapted for engagement with said pivotal latches to release said seat for forward swinging movement, said seat being alternately swingable from either side in response to continued tilting movement of either of said seat backs, the path of movement of said seat being defined by said slots in said guide mechanism at the side adjacent the tilted seat back.

3. A seat having tiltable seat backs pivotally mounted thereon in side by side relation, a pair of generally parallel spaced apart guide mechanisms having arcuate slots formed therein, a pair of rails secured to said seat, a second pair of rails cooperating with said first mentioned rails to provide fore and aft adjustment of said seat to a plurality of fixed positions, legs formed on said cooperating rails and supported on said guide mechanisms, said legs having slots formed therein and adapted to register with said slots in said guide mechanisms, pivot means extending through said slots to slidably secure said seat on said guide mechanisms, a pivotal latch on each of said guide mechanisms normally retaining said seat in a transversely aligned fixed position on said guide mechanisms, projections carried by said seat backs and adapted for engagement with said pivotal latches to release said seat for forward swinging movement, said seat being alternately swingable from either side in response to continued tilting movement of either of said seat backs, the path of movement of said seat being defined by said slots in said guide mechanism at the side adjacent the tilted seat back, and yieldable means for returning said seat to the normal transversely aligned position.

4. In a seat structure for a vehicle body, the combination of a pair of spaced apart relatively flat guide members, fore and aft adjuster means for said seat supported on each of said guide members, each of said adjuster means comprising a supporting rail and a cooperating slidable rail, a seat, a supporting frame for said seat, a pair of tiltable seat backs pivotally mounted on said frame, said seat backs being tiltable forwardly and inwardly from a normally upright position, said slidable rails being secured to said frame, means connecting said supporting rails and said guide members, said connecting means including means adapted to permit limited swingable movement of said seat in either direction relative to said guide members, a pivotal latch on each of said guide mechanisms normally restraining said seat against swingable movement, depending extensions formed on said tiltable backs, stud means carried by said extensions and operable upon initial forward tilting movement of either seat back to swingably disengage said latch to permit forward movement of said seat, and means limiting pivotal movement of said latch to provide a fixed abutment for said studs after said initial movement whereby continued forward movement of said seat back causes temporary forward displacement of said seat.

5. A seat structure having tiltable back portions pivotally mounted thereon, a pair of spaced apart guide mechanisms, fore and aft adjuster means disposed between said seat and said guide mechanisms, said adjuster means comprising cooperating slidable rails having means associated therewith for securing one of said rails in a plurality of longitudinal fixed positions relative to the other of said rails, one of said rails being rigidly secured to said seat and the other of said rails being slidably secured to said guide mechanisms, means on said guide mechanisms normally engaging the latter of said rails to prevent movement thereof, projections formed on said back portions and adapted to engage said last mentioned means upon tilting movement of said backs to release said rail for slidable movement, said last mentioned means being adapted to provide a fixed abutment for said projections after initial movement whereby continued tilting movement of either of said backs imparts horizontal swinging movement to said seat, and means yieldably urging said seat to the latched position upon release of said seat back.

6. The structure claimed in claim 3 wherein said yieldable means comprises a coil spring disposed in tension between one of said legs and said slidable rail.

7. The structure claimed in claim 4 wherein said means limiting pivotal movement of said latch comprises a generally horizontally extending leg portion formed on said guide mechanism and adapted to engage said latch after initial swinging movement.

References Cited in the file of this patent

UNITED STATES PATENTS

| | | |
|---|---|---|
| 2,189,396 | Greig | Feb. 6, 1940 |
| 2,246,076 | Riley | June 17, 1941 |
| 2,428,217 | Hedley et al. | Sept. 30, 1947 |
| 2,563,220 | Doty | Aug. 7, 1951 |
| 2,591,426 | Hadley | Apr. 1, 1952 |
| 2,618,312 | Bradley | Nov. 18, 1952 |
| 2,660,223 | Appleton | Nov. 24, 1953 |

FOREIGN PATENTS

| | | |
|---|---|---|
| 172,163 | Great Britain | Dec. 8, 1921 |